United States Patent
Nakahashi

(10) Patent No.: US 7,965,070 B2
(45) Date of Patent: Jun. 21, 2011

(54) SWITCHING POWER SUPPLY WITH SLOPE COMPENSATION CIRCUIT AND ADDED SLOPE CIRCUIT

(75) Inventor: Yasunori Nakahashi, Tokyo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 254 days.

(21) Appl. No.: 12/232,182

(22) Filed: Sep. 11, 2008

(65) Prior Publication Data

US 2009/0080227 A1     Mar. 26, 2009

(30) Foreign Application Priority Data

Sep. 13, 2007  (JP) .................... 2007-237791

(51) Int. Cl.
G05F 1/565        (2006.01)
G05F 1/595        (2006.01)
(52) U.S. Cl. ........................ 323/285; 323/282
(58) Field of Classification Search .......... 323/222, 323/224, 282, 284, 285, 286
See application file for complete search history.

(56) References Cited

U.S. PATENT DOCUMENTS

| | | | |
|---|---|---|---|
| 5,903,447 A | | 5/1999 | Takahashi et al. |
| 6,750,637 B2 * | | 6/2004 | Nagaki et al. ............. 323/272 |
| 7,479,773 B2 * | | 1/2009 | Michishita ................. 323/282 |
| 2007/0120548 A1 * | | 5/2007 | Kojima et al. ............. 323/284 |
| 2007/0252567 A1 * | | 11/2007 | Dearn et al. .............. 323/282 |
| 2007/0285073 A1 * | | 12/2007 | Nishida ..................... 323/288 |
| 2008/0061755 A1 * | | 3/2008 | Michishita ................. 323/282 |
| 2008/0074089 A1 * | | 3/2008 | Yu et al. .................... 323/222 |
| 2009/0201000 A1 * | | 8/2009 | Kojima et al. ............. 323/282 |

FOREIGN PATENT DOCUMENTS

| | | |
|---|---|---|
| JP | 11-041924 | 2/1999 |
| JP | 2004-040856 | 2/2004 |
| JP | 2006-246626 | 9/2006 |

* cited by examiner

*Primary Examiner* — Adolf Berhane
*Assistant Examiner* — Fred E Finch, III
(74) *Attorney, Agent, or Firm* — Rabin & Berdo, P.C.

(57) ABSTRACT

A current-mode switching power supply is provided, in which there is no unstable operation arising from the fact that signals to generate PWM signals are minute, even when a load is light and a switching frequency is high. In a switching power supply of this invention, an added slope signal is superposed in an early stage of a rise of a current detection signal, so that a combined signal Vsig is caused to reach a certain magnitude even when the load is light and the switching frequency is high, and consequently an output FB of an error amplifier ERRAMP which is balanced with the combined signal is also increased. By this means, even in a current mode, it is possible to eliminate unstable operation arising from the fact that the feedback signal FB which is the output of the error amplifier ERRAMP and the combined signal Vsig are minute.

20 Claims, 15 Drawing Sheets

SWITCHING POWER SUPPLY WITH SLOPE COMPENSATION CIRCUIT AND ADDED SLOPE CIRCUIT

BACKGROUND OF THE INVENTION

1. Field of the Invention

This invention relates to a-current-mode switching power supply.

2. Description of the Related Art

FIG. 11 is a block diagram of an example of a current-mode switching power supply of the prior art. Here 1 is an input terminal, to which the input voltage VIN of the switching power supply is input; Mp is a P-channel MOS transistor, which is a switching element; Mn is an N-channel MOS transistor, which is a synchronous rectifying element; and the two transistors Mp and Mn are driven by respective driving circuits 2 and 3 so as to be turned on and off in alternation. A smoothing filter, comprising a series circuit of an inductor L and output capacitor Co, is connected to the connection point of the transistors Mp and Mn. By turning on and off in alternation the transistors Mp and Mn connected to the input voltage VIN, the intermittent voltage occurring at the connection point is smoothed by the smoothing circuit comprising the inductor L and output capacitor Co, so that the desired output voltage VOUT is output from the output terminal 4. The output voltage VOUT is divided by the resistors R1 and R2, for input to the inverting-input terminal of an error amplifier ERRAMP. A reference voltage VREF (for convenience, the same name as the circuit is used), corresponding to a target voltage, output from a reference voltage circuit VREF, is input to the non-inverting input terminal of the error amplifier ERRAMP. Further, a phase compensation circuit, comprising a series circuit of a resistor Rc and capacitor Cc, is connected between the output terminal and the inverting input terminal of the error amplifier ERRAMP. By means of this configuration, the error amplifier ERRAMP outputs an error signal according to the difference between the output voltage and the target voltage. Below, this error signal is called a feedback signal FB. The feedback signal FB is input to the inverting input terminal of a PWM comparator PWMCMP, the output signal of which is input to the reset terminal R of an RS flip-flop 5. A signal OSC from an input terminal 6 is input to the set input terminal S of the RS flip-flop 5, and the flip-flop 5 is set by the signal OSC at each prescribed interval so that the Q output goes to H (high).

The current flowing in the switching element Mp is detected by current detection means 7, the current detection signal is added to a slope compensation signal output from a slope compensation circuit 8 by an adder circuit 9, and the result is input to the non-inverting input terminal of the PWM comparator PWMCMP. The slope compensation circuit 8 is also started by the signal OSC at prescribed intervals. The flip-flop Q output is input as a PWM signal to the driving circuits 2 and 3, so that when the flip-flop Q output is H the switching element Mp is on, and when the flip-flop Q output is L (low) the synchronous rectifying element Mn is on. This method, in which the current flowing in the switching element Mp is detected and the switching element is controlled, is called the current mode. It is known that, in a current-mode switching power supply, when the switching element is made to operate at an on-duty (time fraction) of 50% or higher, a phenomenon called subharmonic oscillation occurs, in which there is oscillation at a frequency lower than the switching frequency (see for example Japanese Patent Laid-open No. 2004-40856). The slope compensation circuit 8 prevents this. By adding to the current detection signal a monotonically increasing slope compensation signal output from the slope compensation circuit 8, to raise the slope (rate of increase) of the current detection signal, subharmonic oscillation is prevented.

FIG. 12 shows an example of the configurations of the current detection means 7, slope compensation circuit 8, and adder circuit 9. The driving circuit 2 and transistor Mp are the same as those in FIG. 11, and Rs is a sense resistor for detection of the current flowing in the switching element Mp. The voltages at both terminals of the sense resistor Rs are level-shifted by the level-shift circuits 10 and 11 and are input to the transconductance amplifier 12. Various designs can be applied as level-shift circuits 10 and 11, but a simple configuration, such as for example a voltage divider circuit, may be used. The transconductance amplifier 12 outputs a current according to the difference between the two inputs. In the case of this invention, the output of the transconductance amplifier 12 is a sink current, which absorbs a larger current for larger differences between the two inputs, that is, for larger currents flowing in the switching element Mp. The sink current Is which is the output of the transconductance amplifier 12 is supplied to the power supply VIN via the P-channel MOS transistor M1. The P-channel MOS transistors M2 and M1 are configured as a current mirror circuit, and current I1 flowing in the P-channel MOS transistor M2 is copied from the output current Is of the transconductance amplifier 12 (is either equal to or is proportional to the current Is). This current I1 is equivalent to a current detection signal which detects the current flowing in the switching element Mp.

By using a constant current source I0 and capacitor C1 to configure an integration circuit, such that the constant current (the value of which is also represented by I0) supplied from the constant current source I0 is integrated by the capacitor C1, the voltages across the capacitor C1 (the integration value) rises linearly. The signal OSC is a signal with a constant period, supplied to this circuit from outside, and a reset signal with a prescribed time width is applied at fixed intervals to the gate of the N-channel MOS transistor M3. The N-channel MOS transistor M3 is a reset transistor which is turned on when the signal OSC is the reset signal H, causing the charge on the capacitor C1 to be discharged and resetting the integration voltage. The integration voltage on capacitor C1 is applied to the gate of the N-channel MOS transistor M4. The N-channel MOS transistor M4 operates as a source-follower circuit, and applies a voltage V1=(integration voltage on capacitor C1−threshold voltage of N-channel MOS transistor M4) to the resistor R3. If the resistance value of resistor R3 is R3, then a current I2=V1/R3 flows in the resistor R3, and I2 also becomes a signal which rises linearly. The P-channel MOS transistors M5 and M6 form a current mirror circuit, and the current I3 flowing in the P-channel MOS transistor M6 copies the current I2. This current I3 is equivalent to a slope compensation signal.

If the currents I1 and I3 both flow in the resistor Ra, and if the resistance value of resistor Ra is Ra, then the voltage Vsig across the resistor Ra which results (one end of the resistor Ra is at GND reference potential, so that this is equal to the voltage Vsig on the other end, connected to the P-channel MOS transistors M2 and M6) as a result is Vsig=Ra×(I1+I3) =Ra×I1+Ra×I3. This voltage Vsig is a signal which combines (is the sum of) the current detection signal and the slope compensation signal, and is a signal used for on/off control of the switching element.

FIG. 13 is a timing chart, used to explain operation of the above circuit. Shown from the top in order are the slope compensation signal (equivalent to the current I3 shown in FIG. 12), which is the output of the slope compensation circuit 8; the current detection signal (equivalent to the current I1 in FIG. 12); the combined signal obtained by adding the current detection signal and the slope compensation signal (equivalent to the voltage signal Vsig in FIG. 12); the signal OSC (the signal the H portion of which sets the RS flip-flop 5); the reset signal (output signal of the PWM comparator PWMCMP) of the RS flip-flop 5; and the PWM signal (Q output of the RS flip-flop 5). The signal OSC H level causes the slope compensation circuit 8 to be triggered, so that the slope compensation signal rises (strictly speaking, the signal OSC returns to L, and rises after the integration voltage on the capacitor C1 exceeds the threshold voltage of the N-channel MOS transistor M4), and in addition the RS flip-flop 5 is set, the switching element Mp is turned on, and the current detection signal also rises. The combined signal Vsig which is the output of the adder circuit 9 also rises, and when the combined signal Vsig reaches the level or value of the feedback signal FB which is the output of the error amplifier ERRAMP, the output signal of the PWM comparator PWMCMP goes to H, and the RS flip-flop 5 is reset. When the RS flip-flop 5 is reset, the PWM signal goes to L, the switching element Mp is turned off, and the current detection signal values goes to zero. When the current detection signal becomes zero, the combined signal Vsig becomes a signal which reflects only the slope compensation signal, and the reset signal for the RS flip-flop 5 is canceled. The above operations are repeated upon each period of the signal OSC, to obtain the prescribed output voltage VOUT.

In a current-mode switching power supply if the load is light (the output current is small) and moreover the switching frequency (that is, the frequency of the above signal OSC) is high, then the current detection signal detected by the sense resistance Rs becomes minute. This situation is illustrated in FIG. 14. The signals shown in FIG. 14 are the same as in FIG. 13, but are shown for a case in which the load is light and moreover the switching frequency is high. If the switching frequency is high and the switching period is short, then there must be a balance with the combined signal Vsig which rises in this short switching period (if balance is not achieved, the PWM waveform duty is either too high or too low, the output voltage VOUT changes, and ultimately balance is attained), and compared with cases in which the switching period is long, the output FB of the error amplifier ERRAMP declines. Further, as shown in FIG. 14, if under a light load there is little charge from the output capacitor Co (that is, the output current is small), then the output voltage VOUT increases, so that the feedback signal FB which is output from the error amplifier ERRAMP becomes even smaller. In this way, when under a light load and with a high switching frequency, the feedback signal FB decreases to near zero, and when the value immediately after the combined signal Vsig, which is a sawtooth wave, begins to rise, is still low, the PWM comparator PWMCMP operates (a reset signal is output to the RS flip-flop 5), so that an erroneous pulse is output as shown in FIG. 14, causing unstable operation. Further, because the feedback signal FB, which is the output of the error amplifier ERRAMP, is minute, the signal is readily affected by noise, and this also gives rise to unstable operation.

SUMMARY OF THE INVENTION

In the method disclosed in Japanese Patent Laid-open No. 2004-40856 of adding a slope compensation signal from midway in the switching period, the above-described problem relating to cases in which the load is light and moreover the switching frequency is high is further exacerbated (the rise of the combined signal Vsig becomes even smaller, and the output FB of the error amplifier ERRAMP which is balanced with this becomes still more minute).

This invention was devised in light of the above problems, and has as an object the provision of a current-mode switching power supply in which, even under light loads and when moreover the switching frequency is high, there are no causes of unstable operation arising from minute signals used to generate PWM signals.

Hence in order to solve the above problems, in a first aspect the invention includes: a switching power supply for controlling on/off of a switching element to generate a prescribed output voltage, having an error amplifier, which compares the output voltage, or a divided voltage thereof, with a reference voltage and outputs an error signal according to a difference therebetween; current detection means, which detects a current flowing in the switching element; and an added slope circuit, which generates an added slope signal that is reset to zero prior to turn-on of the switching means, begins to increase when the switching means turns on and is halted or stopped from increasing after a prescribed time shorter than a switching period of the switching element, wherein a sum signal is determined by adding an output of the current detection means and the added slope signal, the sum signal and the error signal are compared, and the switching element is turned off when the sum signal becomes equal to the error signal.

In a second aspect, the first aspect further includes a slope compensation circuit which generates a slope compensation signal to prevent subharmonic oscillation, wherein in place of the sum signal, a second sum signal, obtained by further adding the slope compensation signal to the sum signal, is compared with the error signal, and the switching element is turned off when the second sum signal becomes equal to the error signal.

In a third aspect, the first aspect further includes a slope compensation circuit which generates a slope compensation signal to prevent subharmonic oscillation, wherein in place of the error signal, a difference signal, obtained by subtracting the slope compensation signal from the error signal, is compared with the sum signal, and the switching element is turned off when the sum signal becomes equal to the difference signal.

A fourth aspect includes the features of any of the first through third aspects, wherein the added slope circuit has a capacitor which is charged by a constant current, and a voltage across the capacitor is used as the added slope signal.

A fifth aspect includes the features of the fourth aspect, wherein the constant current is proportional to a switching frequency of the switching element.

A sixth aspect includes the features of any of the first through third aspects, wherein a rate of increase of the added slope signal is proportional to a switching frequency of the switching element.

A seventh aspect includes the features of any of the fifth or sixth aspects, wherein the prescribed time is proportional to the switching frequency of the switching element.

An eighth aspect includes the features of the first aspect, wherein the current detection means detects a voltage across a resistance connected to the switching element.

A switching power supply of this invention superimposes an added slope signal in an early stage of a rise of a current detection signal, so that even when a load is light and a switching frequency is high, by causing a combined signal Vsig to reach a certain magnitude, an output FB of an error amplifier ERRAMP which is balanced with this is also increased, and even in a current mode, causes of unstable operation arising from the minuteness of the signal used to generate PWM signals can be eliminated.

DESCRIPTION OF THE PREFERRED EMBODIMENTS

Below, a switching power supply of the invention is explained using the drawings.

Figure 1:
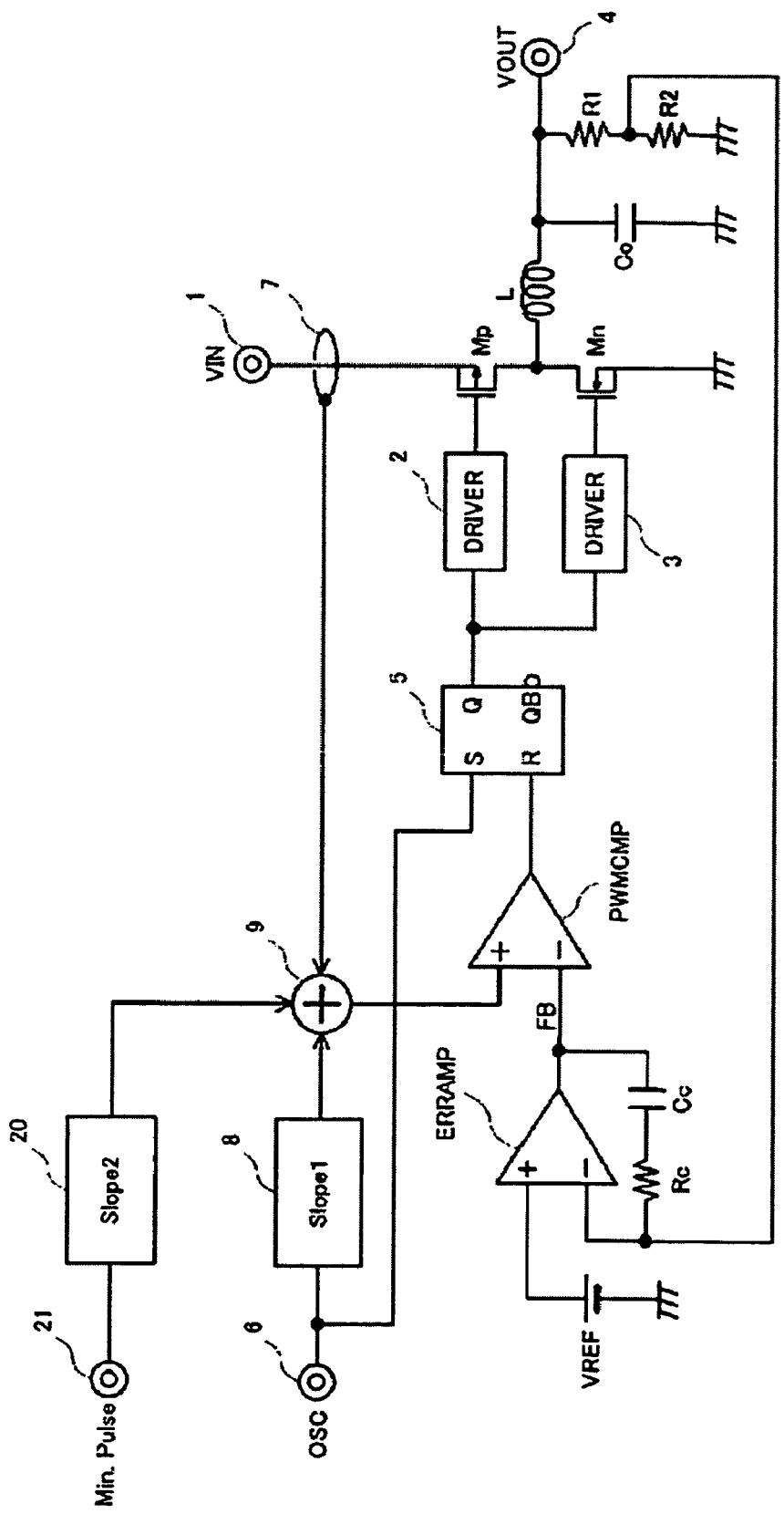
FIG. 1 shows an example of an overall configuration of a switching power supply of the invention.
Figure 11:
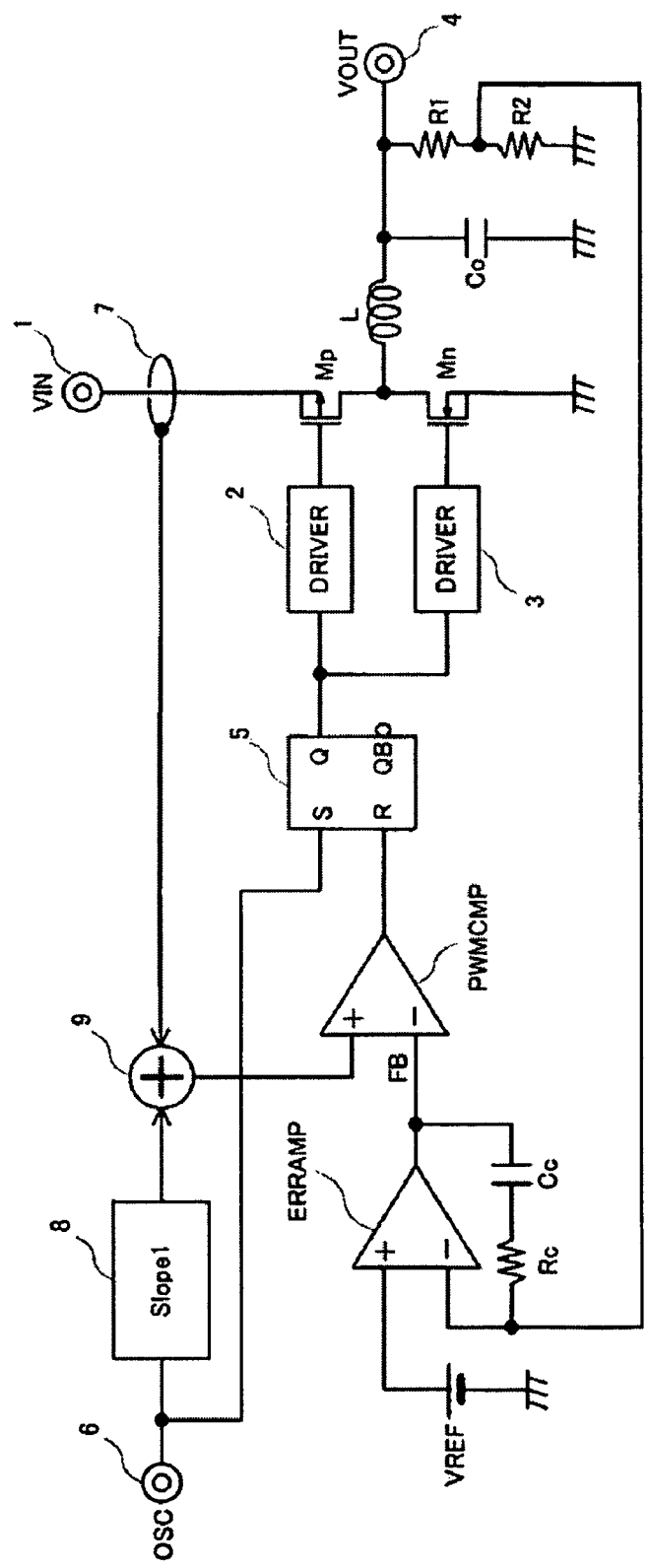
FIG. 11 is a circuit diagram showing an example of a current-mode switching power supply of the prior art.

FIG. 1 shows an example of an overall configuration of a switching power supply of the invention. Portions which are the same as in FIG. 11 are assigned the same symbols, and detailed explanations are omitted. Differences of this embodiment with the switching power supply shown in FIG. 11 are the provision of an added slope circuit 20, and the use of an added slope signal which is the output thereof as a third input signal to the adder circuit 9. A signal Min. Pulse is input to the added slope circuit 20 from an input terminal 21. A monotonically increasing signal is generated over an interval specified by the signal Min. Pulse, and this signal is input to the adder circuit 9 as the added slope signal. The signal Min. Pulse has a same frequency as a signal OSC (that is, the same frequency as the switching frequency), and is a synchronized signal; when a new period of the signal OSC begins, the added slope circuit 20 is instructed to generate an added slope signal.

Figure 2:
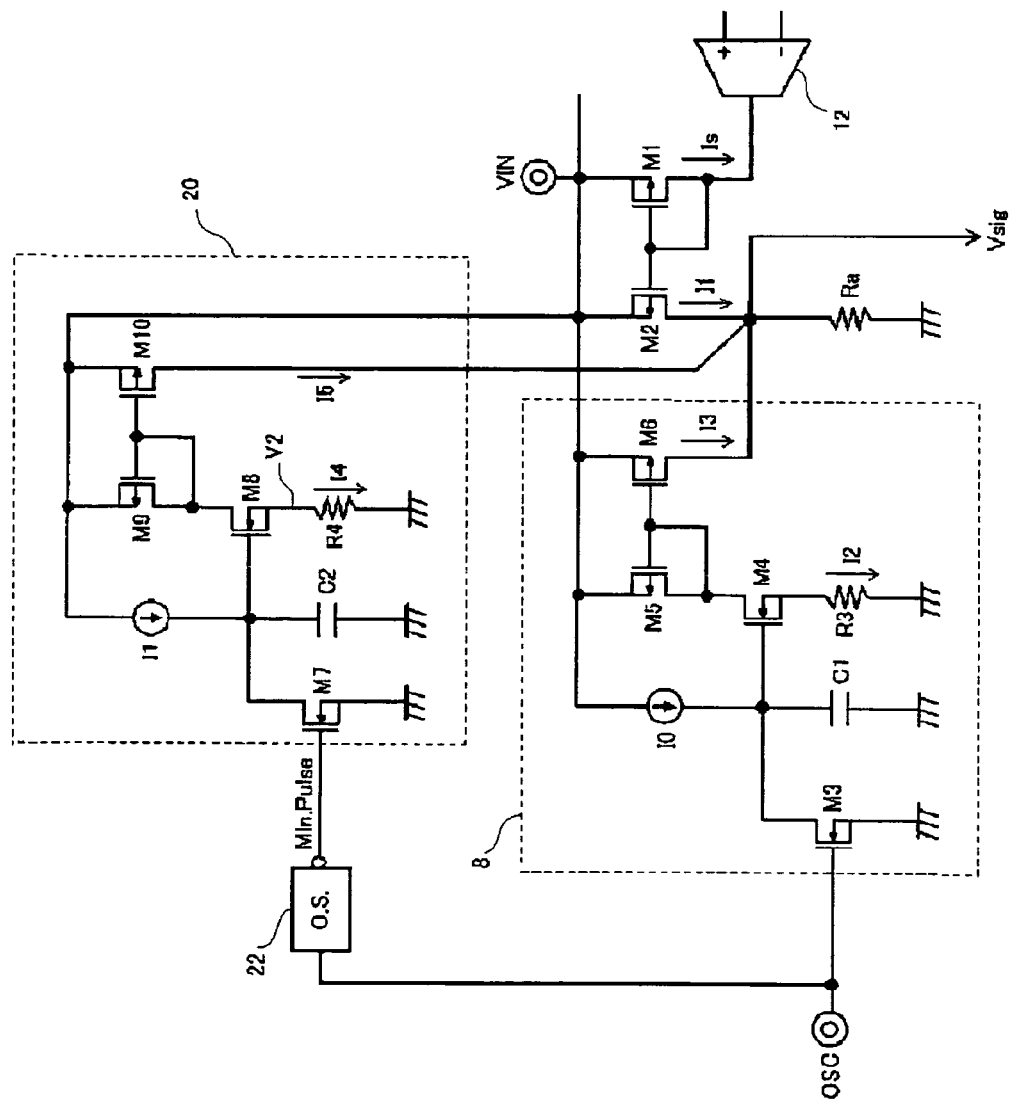
FIG. 2 is a circuit diagram showing a first configuration example of an added slope circuit 20 as well as related portions.
Figure 12:
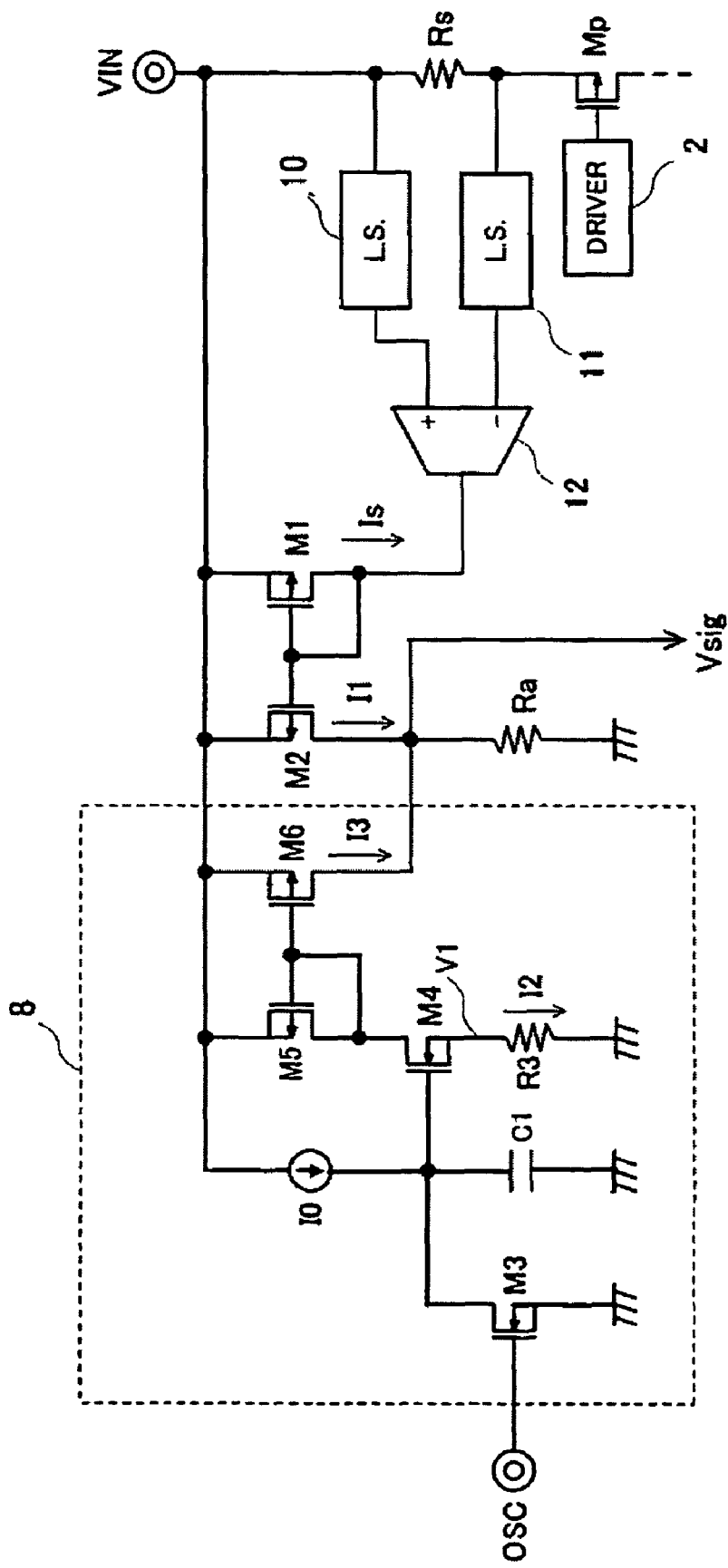
FIG. 12 is a circuit diagram showing an example of the configuration of a current detection means 7, a slope compensation circuit 8, and an adder circuit 9.
Figure 13:
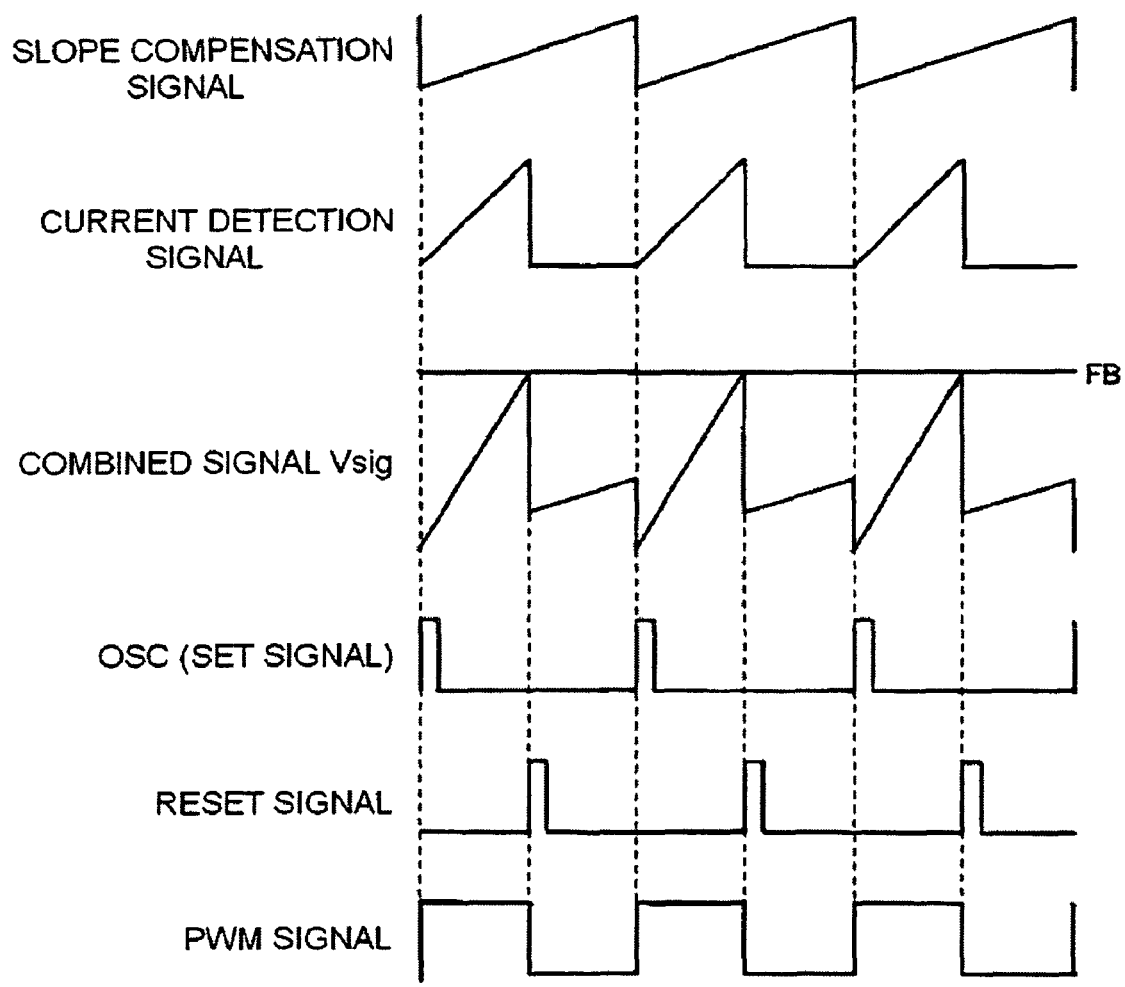
FIG. 13 is a timing chart used to explain operation of the circuits of FIG. 11 and FIG. 12.
Figure 14:
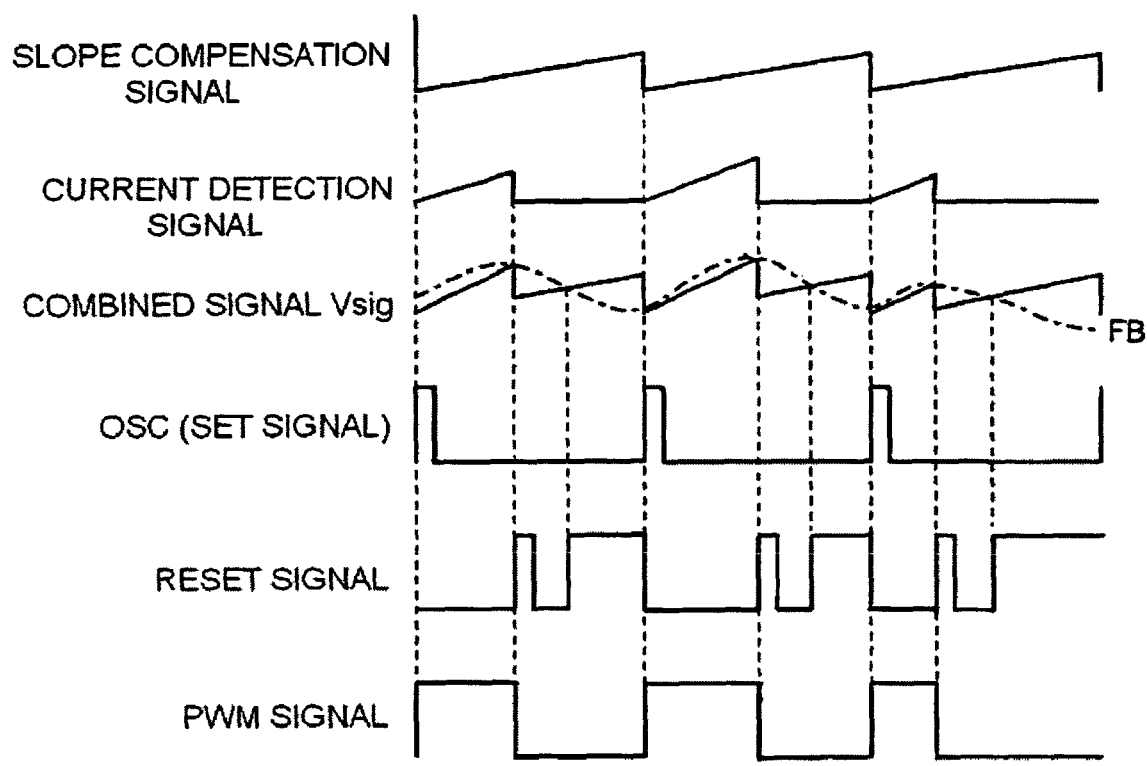
FIG. 14 is a diagram showing a manner in which, when a load is light and a switching frequency is high, a current detection signal detected by a sense resistance Rs is minute.

FIG. 2 shows a first configuration example of the added slope circuit 20, together with related portions. In the FIG., portions which are the same as in FIG. 12 are assigned the same symbols, and detailed explanations are omitted. In FIG. 2, the added slope circuit 20 has N-channel MOS transistors M7 and M8, P-channel MOS transistors M9 and M10, a constant current source I1, a capacitor C2, and a resistor R4. The configuration is similar to that of the slope compensation circuit 8; the constant current source I1 and capacitor C2 form an integration circuit, and the N-channel MOS transistor M7 is the reset transistor for the integration circuit. When the signal Min. Pulse, which may be an output of a one-shot circuit 22, is L, the reset transistor M7 is turned off, so that during this interval the constant current (the value of which is also I1) from the constant current source is integrated by the capacitor C2 (the capacitance value of which is also C2), and if a time duration is t, then the voltage across the capacitor C2 rises linearly as $I1 \times t / C2$. The integration voltage on the capacitor C2 is applied to the gate of the N-channel MOS transistor M8, the N-channel MOS transistor M8 acts as a source-follower circuit, and a voltage V2=(integration voltage of capacitor C2−threshold voltage of N-channel MOS transistor M8) is applied to the resistor R4. If the resistance value of the resistor R4 is also R4, then a current $I4 = V2/R4$ flows in the resistor R4, and I4 is a signal which also rises linearly. The P-channel MOS transistors M9 and M10 are configured as a current mirror circuit, and the current I5 flowing in the P-channel MOS transistor M10 copies the current I4. This current I5 is equivalent to the added slope signal.

The current I5 flows in the resistor Ra together with the currents I1 and I3, and the resulting combined signal Vsig becomes $Vsig = Ra \times (I1+I3+I5) = Ra \times I1 + Ra \times I3 + Ra \times I5$.

When the signal Min. Pulse is H, the reset transistor M7 is turned on, so that the added slope signal I5 becomes zero, and the added slope signal does not contribute to generation of the combined signal Vsig. The signal OSC is input to the one-shot circuit 22, and the one-shot circuit 22 generates a signal which is L for a prescribed interval after OSC rises, and then goes to H.

Figure 3:
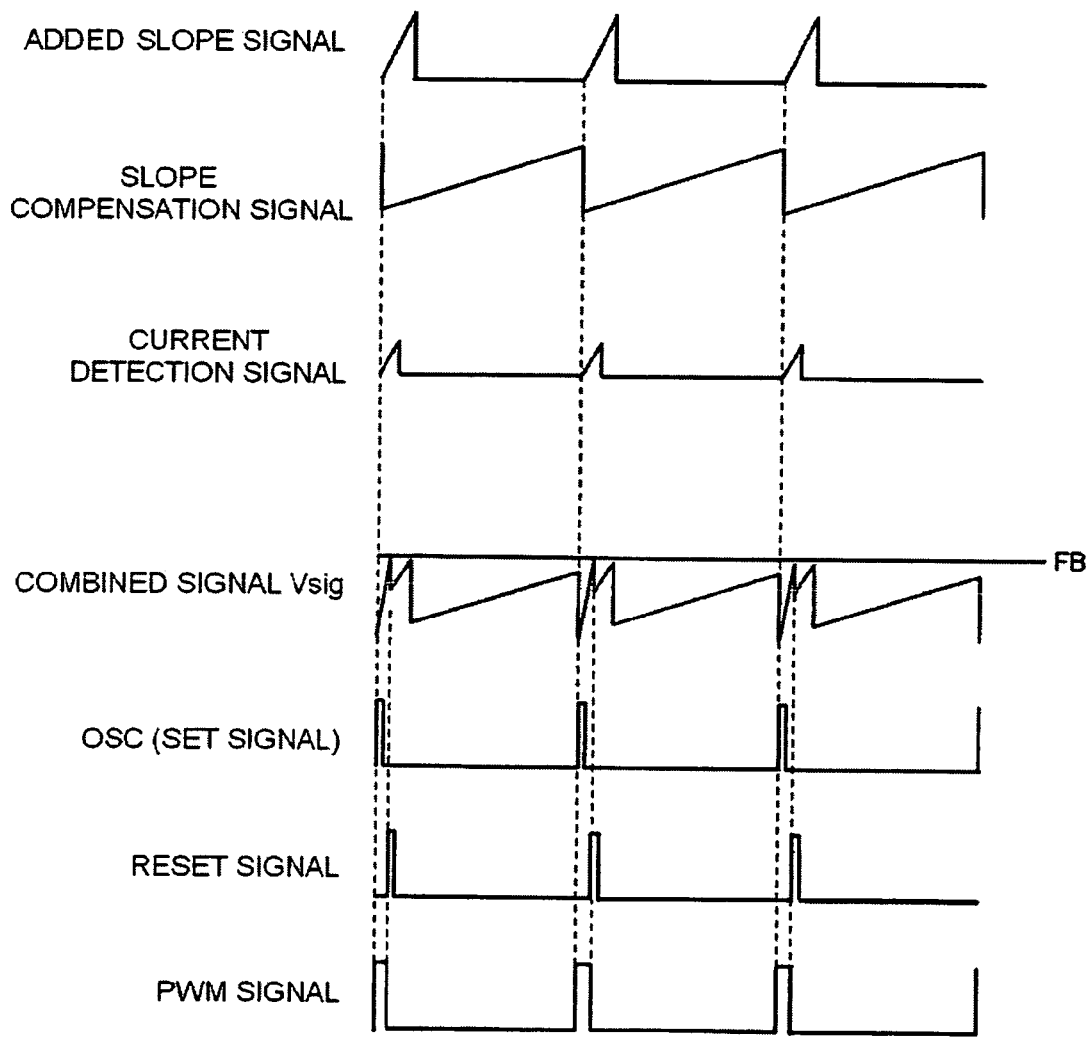
FIG. 3 is a timing chart for circuits of FIG. 1 and FIG. 2.
Figure 4:
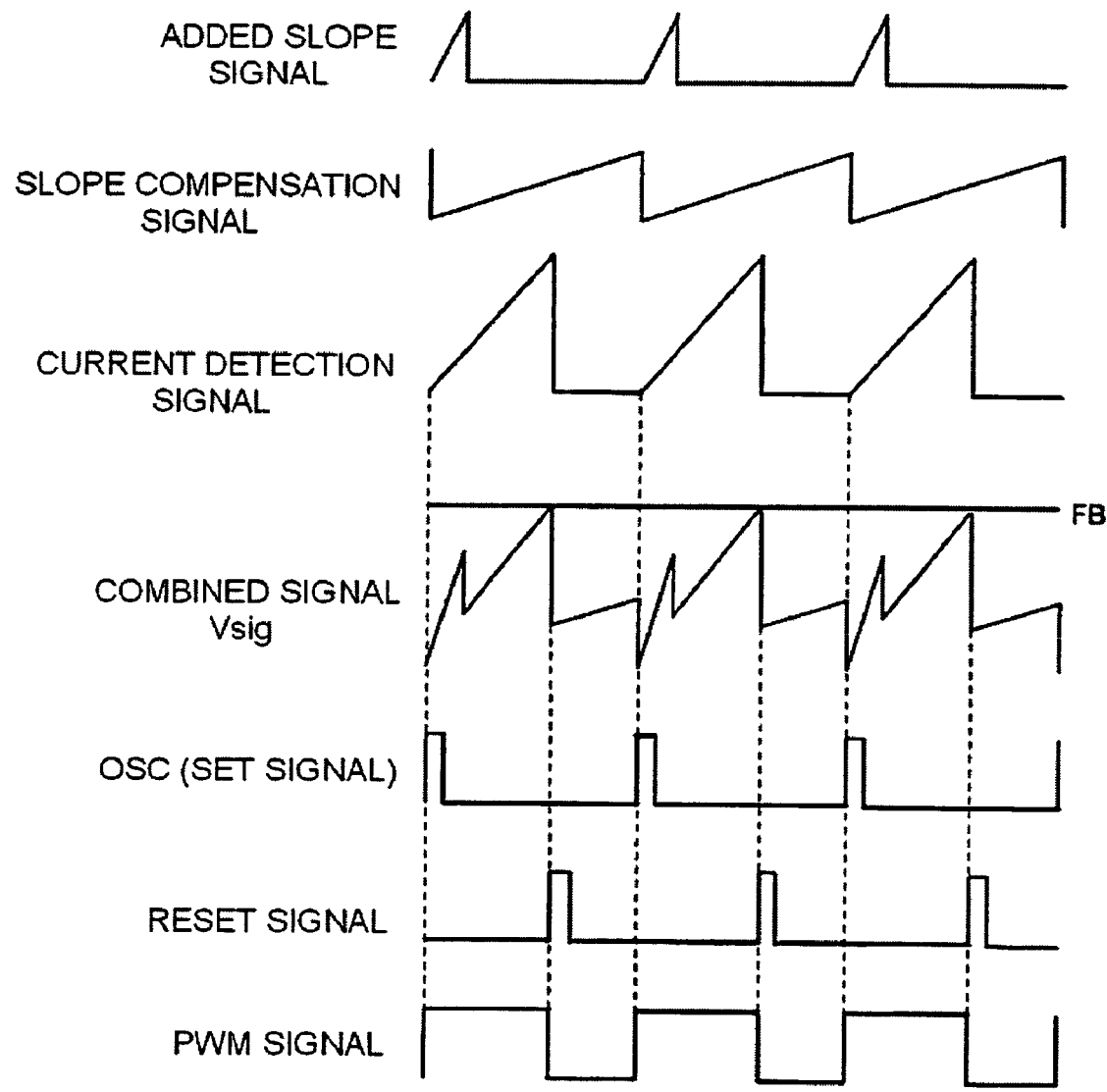
FIG. 4 is another timing chart for the circuits of FIG. 1 and FIG. 2.

Timing charts for the circuits of FIG. 1 and FIG. 2 are shown in FIG. 3 and FIG. 4. FIG. 3 is for a case in which the feedback signal FB, which is the output of the error amplifier ERRAMP, is small, and while the added slope signal is increasing the combined signal Vsig and the feedback signal FB are equal; FIG. 4 is for a case in which the feedback signal FB is large, and after the interval in which the added slope signal increases has ended, the combined signal Vsig and feedback signal FB are equal.

In FIG. 3, when the OSC signal goes to H, the slope compensation circuit 8 is triggered and the slope compensation signal rises, as explained above, and in addition the one-shot circuit 22 outputs a signal (Min. Pulse signal) which is at L for a prescribed interval, and the added slope signal also rises (begins to increase). During this prescribed interval, the sum of the added slope signal, slope compensation signal, and current detection signal is the combined signal Vsig (the current detection signal goes to zero when the switching element is turned off and no longer contributes to the combined signal Vsig). The feedback signal FB is small, so that the combined signal Vsig and feedback signal FB are equal during the above prescribed interval, and after the PWM signal ends (goes to L) and the switching element Mp is turned off, the current detection signal also goes to zero. In this case, although the feedback signal FB is small, an added slope signal with a gradient of a certain magnitude is superposed on the current detection signal, so that the combined signal Vsig also has a certain magnitude, and the feedback signal FB balanced with this (with an appropriate time ratio provided upon becoming equal to the combined signal Vsig)

also takes on a larger value than in the prior art, so that unstable operation arising from the fact that the feedback signal FB and combined signal Vsig are minute can be eliminated.

FIG. 4 illustrates a case in which the load is not light, in a region in which the feedback signal FB is large even in the prior art. If, even after the above prescribed interval has elapsed, the combined signal Vsig and feedback signal FB do not become equal, then the added slope signal returns to zero, and thereafter the sum of the slope compensation signal and the current detection signal is used as the combined signal Vsig. When this combined signal Vsig becomes equal to the feedback signal FB, the switching element Mp turns off, and the current detection signal goes to zero; thereafter the combined signal Vsig reflects only the slope compensation signal.

Figure 5:
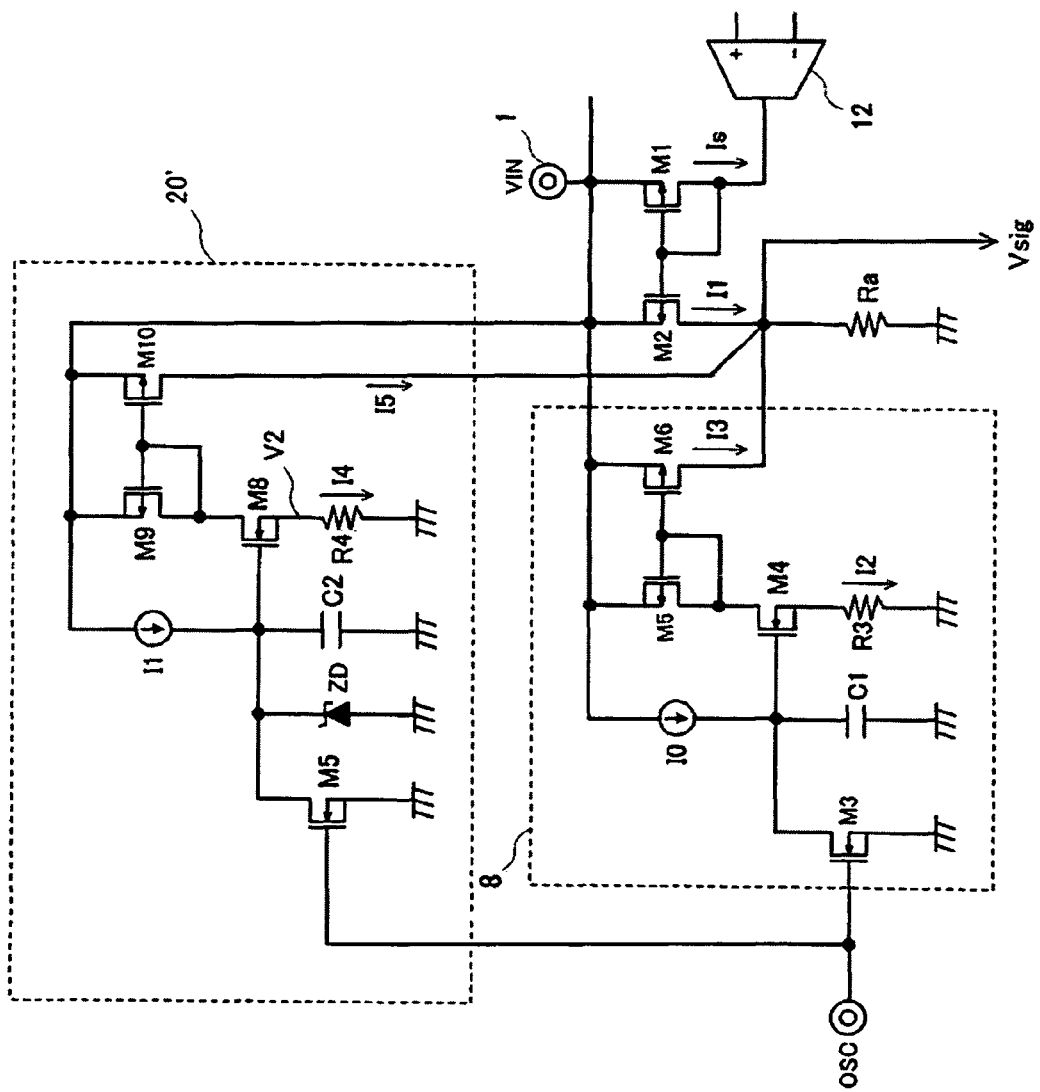
FIG. 5 is a circuit diagram showing a second configuration example of the added slope circuit 20 as well as related portions.

FIG. 5 shows a second configuration example of the added slope circuit, together with relevant portions. The circuit shown in FIG. 5 substitutes a second added slope circuit 20' for the first added slope circuit 20 of FIG. 2. The signal OSC is directly input to the second added slope circuit 20', rather than the output Min. Pulse of the one-shot circuit 22. A difference of the second added slope circuit 20' with the first added slope circuit 20 is the provision of a Zener diode ZD in parallel with the capacitor C2. Excluding the Zener diode ZD, the configuration and operation of the second added slope circuit 20' are similar to those of the slope compensation circuit 8. That is, the second added slope circuit 20' is triggered by the signal OSC, and generates an added slope signal I5 which increases with a fixed slope, similarly to the slope compensation circuit 8. The increase in the added slope signal I5 does not continue until the end of the switching period; when the integration voltage of (voltage across) the capacitor C2 reaches the Zener voltage Vz of the Zener diode ZD, the added slope signal I5 is clamped, and the increase ends. That is, the integration voltage of the capacitor C2 is clamped by Vz, so that the voltage V2 subsequently becomes a fixed voltage (Vz—threshold voltage of the N-channel MOS transistor M8), and as a result the currents I4 and I5 are also constant currents.

Figure 6:
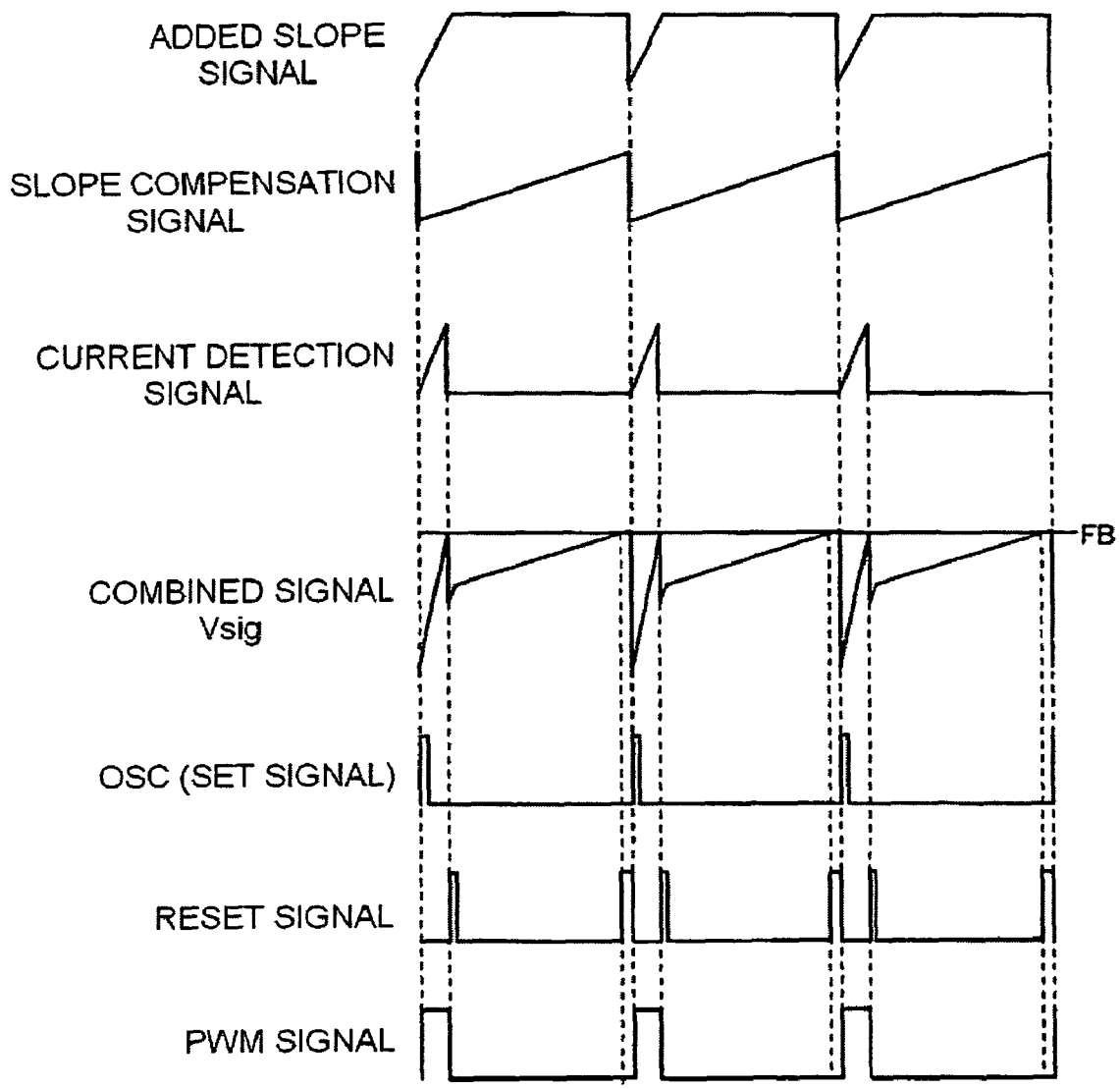
FIG. 6 is a timing chart for the circuits of FIG. 1 and FIG. 5.
Figure 7:
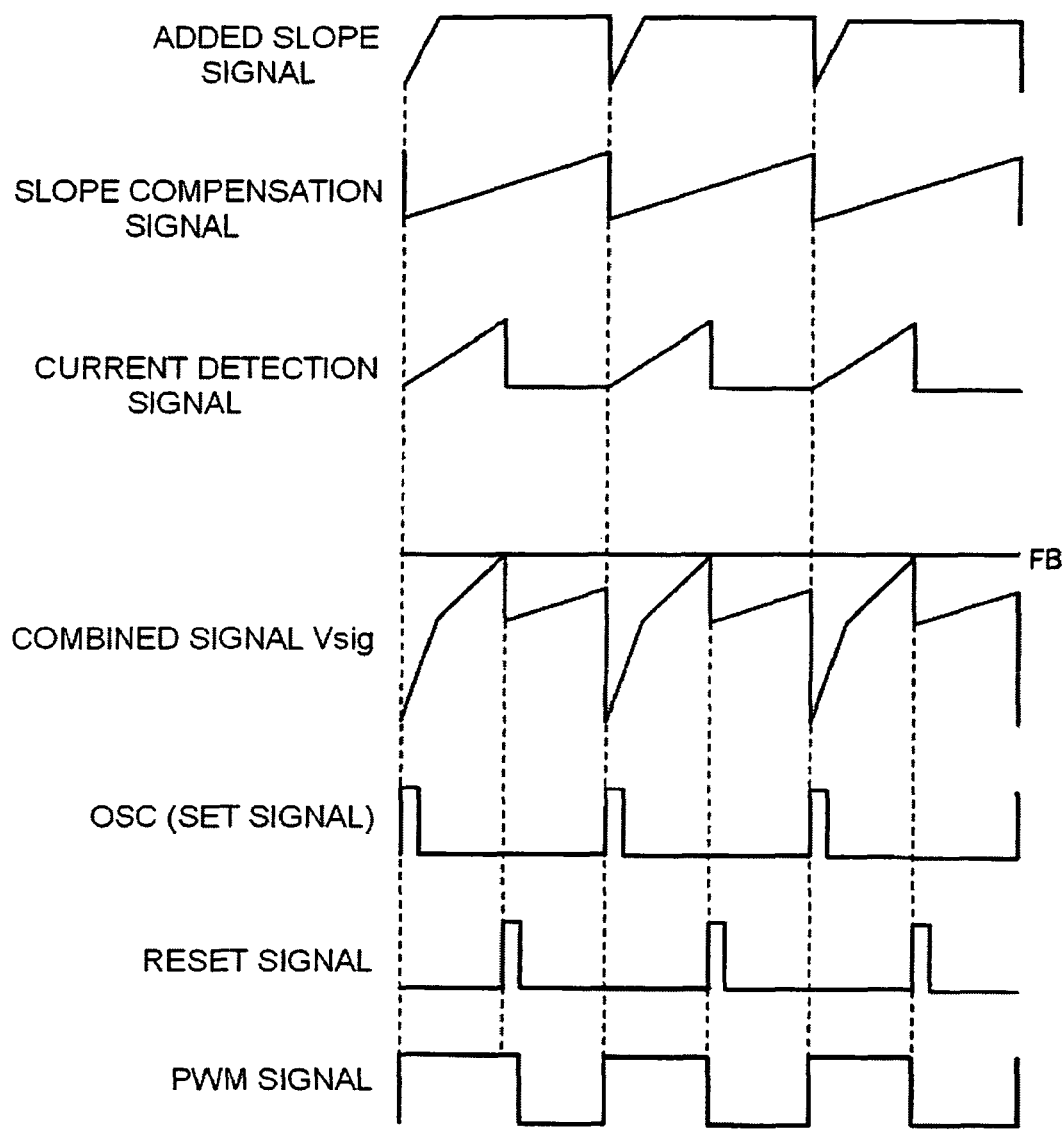
FIG. 7 is another timing chart for the circuits of FIG. 1 and FIG. 5.

Timing charts for the circuits in FIG. 1 and FIG. 5 are shown in FIG. 6 and FIG. 7 (with the signal Min. Pulse in FIG. 1 replaced with the signal OSC). FIG. 6 and FIG. 7 correspond to FIG. 3 and FIG. 4 corresponding to FIG. 1 and FIG. 2, and are, respectively, timing charts for a case in which the feedback signal FB which is the output of the error amplifier ERRAMP is small, and the combined signal Vsig and feedback signal FB are equal when the added slope signal is rising, and for a case in which the feedback signal FB is large, and the combined signal Vsig and feedback signal FB are equal after the end of an interval in which the added slope signal is increasing.

In FIG. 6, when the OSC signal goes to H, the slope compensation circuit 8 is triggered and the slope compensation signal rises, similarly to the above-described embodiment, and moreover the second added slope circuit 20' is also triggered, and the added slope signal rises (increase is begun). Until the integration voltage of the capacitor C2 reaches the Zener voltage Vz of the Zener diode ZD, the combined signal Vsig is the sum of the added slope signal, the slope compensation signal, and the current detection signal (the current detection signal becomes zero when the switching element is turned off, and no longer contributes to the combined signal Vsig). The feedback signal FB is small, so that the combined signal Vsig and feedback signal FB become equal before the integration voltage of the capacitor C2 reaches the Zener voltage Vz of the Zener diode ZD, the PWM signal ends (becomes L), and the switching element Mp also turns off, so that the current detection signal also becomes zero. In this case, even though the feedback signal FB is small, similarly to the above-described embodiment, the added slope signal, having a certain magnitude, is superposed on the current detection signal, so that the combined signal Vsig also has a certain magnitude, and the feedback signal FB which is balanced with this has a larger value than in the prior art, and unstable operation arising from the minuteness of the feedback signal FB and combined signal Vsig can be eliminated.

FIG. 7 illustrates a case in which loading is not light, and the feedback signal FB is large even in the prior art. If the combined signal Vsig and feedback signal FB do not become equal even when the integration voltage on the capacitor C2 reaches the Zener voltage Vz of the Zener diode ZD, the added slope signal holds a constant value at the time at which the integration voltage on the capacitor C2 reaches the Zener voltage Vz, and thereafter the combined signal Vsig is the sum of this constant value, the slope compensation signal, and the current detection signal. When this combined signal Vsig reaches the value of the feedback signal FB, the switching element Mp is turned off and the current detection signal goes to zero, so that thereafter the combined signal Vsig is the sum of the slope compensation signal and the above-described constant value.

In the above-described embodiment, the magnitude of the constant current I1 of the constant current source I1 may be proportional to the frequency of the signal OSC, that is, to the switching frequency. This is because the switching frequency can change, but even if the switching frequency or switching period changes the constant current I1 is constant, and because when the switching period is short the rise of the added slope signal is too slow, but when the switching period is long the rise of the added slope signal is too fast, so that problems occur. The switching frequency may be changed depending on the load, on changes in input and output voltages, and for similar reasons. With respect to the added slope signal, it is desirable that the pulse width of the Min. Pulse signal be made proportional to the switching period, and that after this time has elapsed the magnitude of the added slope signal be made constant regardless of the switching frequency, or that the time until the integration voltage on the capacitor C2 reaches the Zener voltage Vz be proportional to the switching period. In order to achieve this, it is sufficient that the constant current I1 be inversely proportional to the switching period, that is, proportional to the switching frequency.

Figure 8:
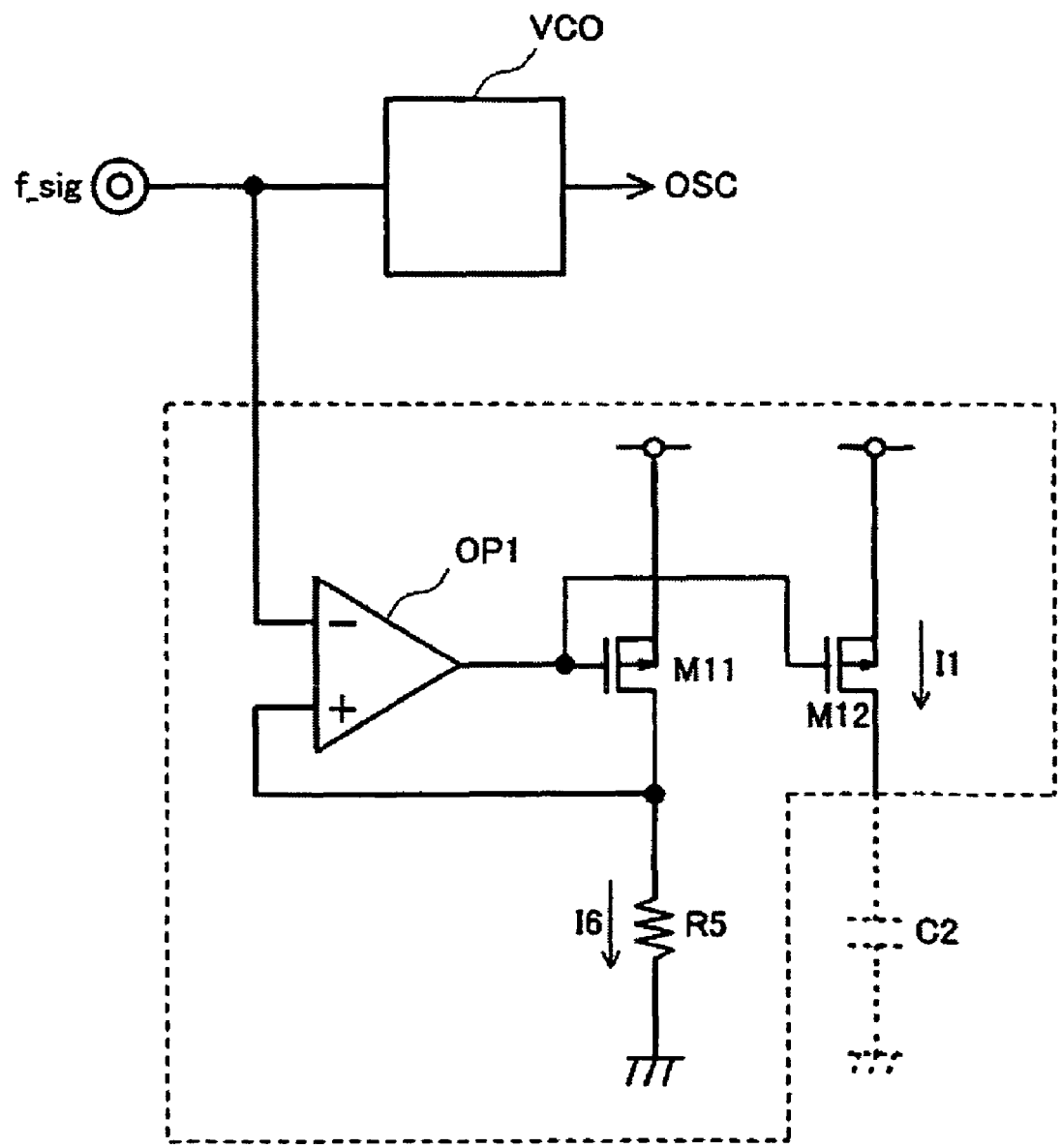
FIG. 8 shows an example of a circuit which provides a constant current I1 proportional to a switching frequency.

FIG. 8 shows an example of a circuit which provides a constant current I1 proportional to the switching frequency. In FIG. 8, VCO is a voltage controlled oscillator, which generates and outputs a signal OSC at a frequency proportional to the voltage of an input signal f_sig. The circuit of FIG. 8 has an op-amp (operational amplifier) OP1, P-channel MOS transistors M11 and M12, and a resistor R5; this portion is equivalent to the constant current source I1. The input signal f_sig is input to the inverting-input terminal of the op-amp OP1, and the output of the op-amp OP1 is connected to the gates of the P-channel MOS transistors M11 and M12. As the output, the drain of the P-channel MOS transistor M11 is connected to one end of the resistor R5 and to the non-inverting input terminal of the op-amp OP1. By means of this configuration, the inverting input terminal and non-inverting input terminal of the op-amp OP1 are virtually short-circuited, so that the voltage of the input signal f_sig is applied to the resistor R5. Hence a current I6 which is proportional to the voltage of the input signal f_sig, that is, proportional to the switching frequency, flows in the resistor R3. The P-channel MOS transistors M1 and M12 form a current mirror circuit, and current flowing in the P-channel MOS transistor M12 is equal to, or proportional to, the current I6 flowing in the P-channel MOS transistor M11 (that is, the current flowing in the resistor R3). Hence the current supplied from the drain of the P-channel MOS transistor M12 is proportional to the switching frequency, and it is this current that is integrated by the capacitor C2 as the constant current I1.

Figure 9:
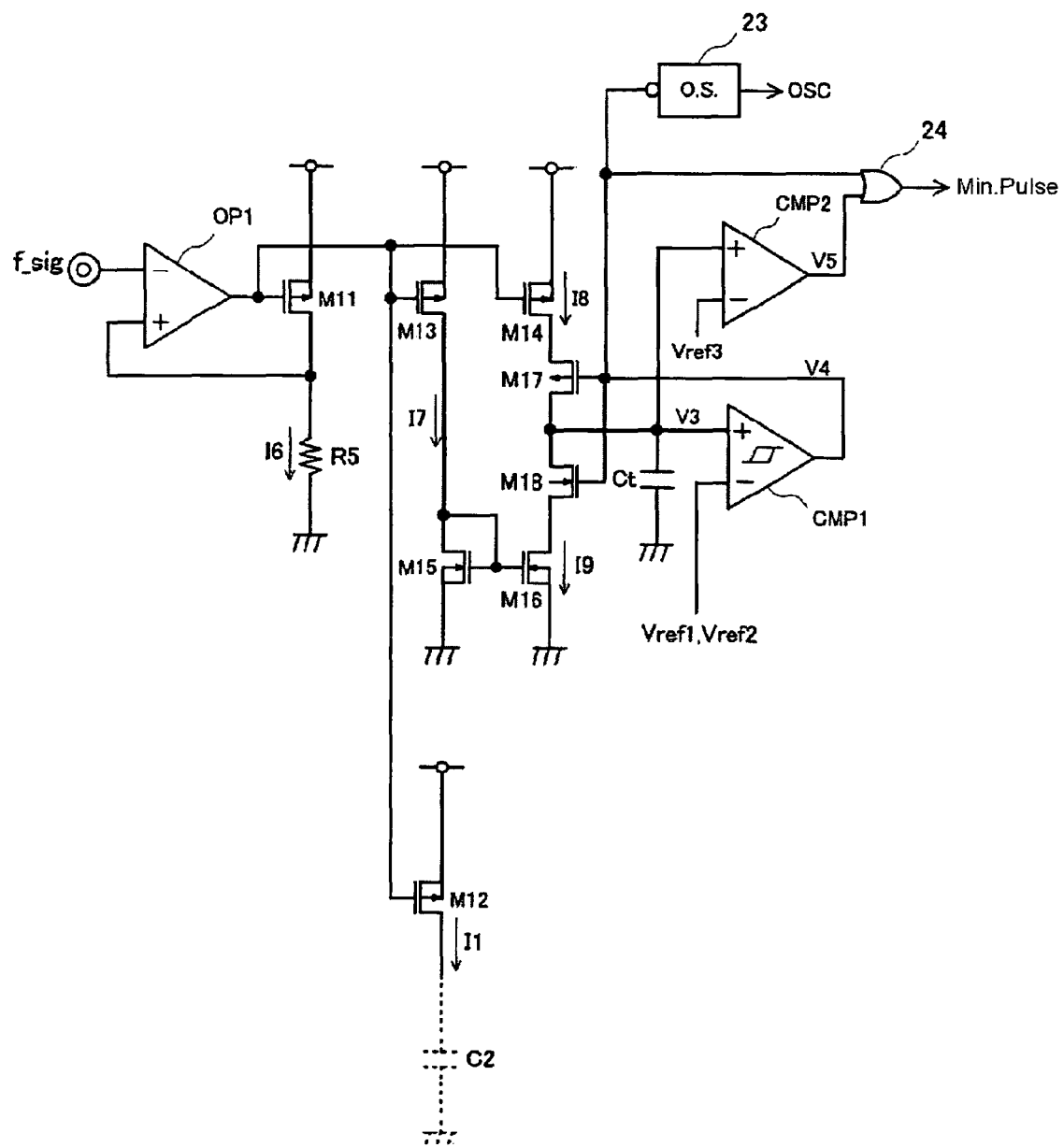
FIG. 9 shows an example of the configuration of a circuit which provides output from a voltage controlled oscillator VCO and a Min. Pulse signal with pulse width proportional to a switching period.

FIG. 9 shows an example of a configuration of a circuit which provides a Min. Pulse signal pulse width proportional to the voltage controlled oscillator VCO and the switching period. In this circuit, the op-amp (operation amplifier) OP1, P-channel MOS transistor M11 and resistor R5 which are components of the constant current source I1 are shared with the voltage controlled oscillator VCO. In addition, the voltage controlled oscillator VCO has P-channel MOS transistors M13, M14, M17; N-channel MOS transistors M15, M16, M18; a capacitor Ct; a one-shot circuit 23; a hysteresis comparator CMP1; a comparator CMP2; and an OR gate 24. The P-channel MOS transistors M13 and M14 form a current mirror circuit with gates connected in common, and the current I7 flowing in the P-channel MOS transistor M13 and current I8 flowing in the P-channel MOS transistor M14 are equal to, or proportional to, the current I6 flowing in the P-channel MOS transistor M11. The P-channel MOS transistor M13 and N-channel MOS transistor M15 are connected in series, and the N-channel MOS transistors M15 and M16 form a current mirror circuit, so that the current I9 flowing in the N-channel MOS transistor M16 is equal to, or proportional to, the current I7. The P-channel MOS transistors M14 and M17 and N-channel MOS transistors M18 and M16 are connected in series, and the P-channel MOS transistor M17 and N-channel MOS transistor M18 are turned on and off in alternation by the output V4 of the hysteresis comparator CMP1, so that the capacitor Ct, connected to the connection point of the P-channel MOS transistor M17 and N-channel MOS transistor M18, is in a state of either being charged by the current I8 (when the P-channel MOS transistor M17 is turned on), or of being discharged by the current I9 (when the N-channel MOS transistor M18 is turned on). The charged voltage V3 of the capacitor Ct is compared with reference voltages Vref1 and Vref2 (where Vref1<Vref2) by the hysteresis comparator CMP1, and is compared with the reference voltage Vref3 (where Vref1<Vref3<Vref2) by the comparator CMP2. The logical sum of the output V4 of the hysteresis comparator CMP1 and the output V5 of the comparator CMP2 is taken by the OR gate 24, to become the signal Min. Pulse. The output V4 of the hysteresis comparator CMP1 is input to the one-shot circuit 23, and the one-shot circuit 23 is triggered by the falling edge of the signal V4 to output an H pulse with a fixed width.

Figure 10:
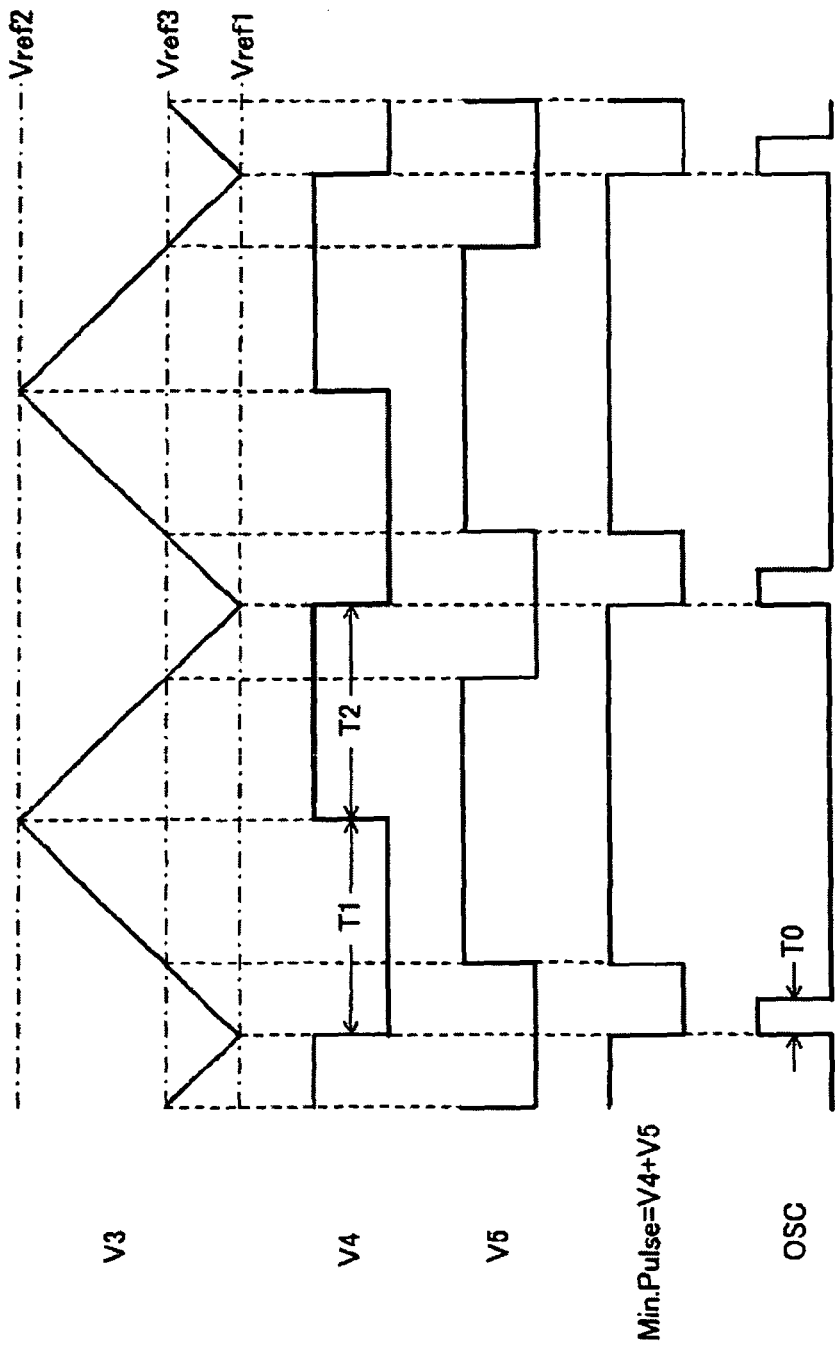
FIG. 10 is a timing chart used to explain operation of the circuit of FIG. 9.

Operation of the circuit of FIG. 9 is explained using the timing chart of FIG. 10. When the output V4 of the hysteresis comparator CMP1 is H, the charge on the capacitor Ct is discharged by the constant current I9, so that the integration voltage V3 on the capacitor Ct declines linearly. When the voltage V3 reaches the reference voltage Vref1, the output V4 of the hysteresis comparator CMP1 is inverted to become L, and the reference voltage of the hysteresis comparator CMP1 switches from Vref1 to Vref2. When the output V4 of the hysteresis comparator CMP1 is L, the capacitor Ct is charged by the constant current I8, so that the integration voltage V3 on the capacitor Ct increases linearly. When the voltage V3 reaches the reference voltage Vref2, the output V4 of the hysteresis comparator CMP1 is inverted to become H, and the reference voltage of the hysteresis comparator CMP1 switches from Vref2 to Vref1. This operation is repeated, and the integration voltage V3 on the capacitor Ct becomes a triangular wave which oscillates between Vref1 and Vref2.

On the other hand, the comparator CMP2 compares the integration voltage V3 on the capacitor Ct and the reference voltage Vref3, and outputs the signal V5. The OR gate 24 takes the logical sum of the signal V4 and signal V5, which becomes the signal Min. Pulse, which is L in the interval from the rising edge of the signal OSC until the integration voltage V3 on the capacitor Ct reaches the reference voltage Vref3. If the time during which the signal V4 is L is T1 and the time during which the signal V4 is H is T2, then T1=K1×I6 and T2=K2×I6 (where K1 and K2 are constants). If the pulse width (the interval in which the signal is at L level) of the signal Min. Pulse is T0, then T0=T1×(Vref3−Vref1)/(Vref2−Vref1), so that the ratio of T0 to the switching period (=T1+T2) is T0/(T1+T2)=(K1/(K1+K2))×(Vref3−Vref1)/(Vref2−Vref1), and is a constant value independent of the switching frequency.

Further, this invention is effective even when slope compensation is not performed. In this case, in the above explanation it is sufficient to consider the slope compensation signal to always be zero. The combined signal Vsig is the sum of the added slope signal and the current detection signal. If this is considered to be a first sum signal, then a signal resulting from addition of the above-described added slope signal, slope compensation signal, and current detection signal can be regarded as a second sum signal.

Figure 15:
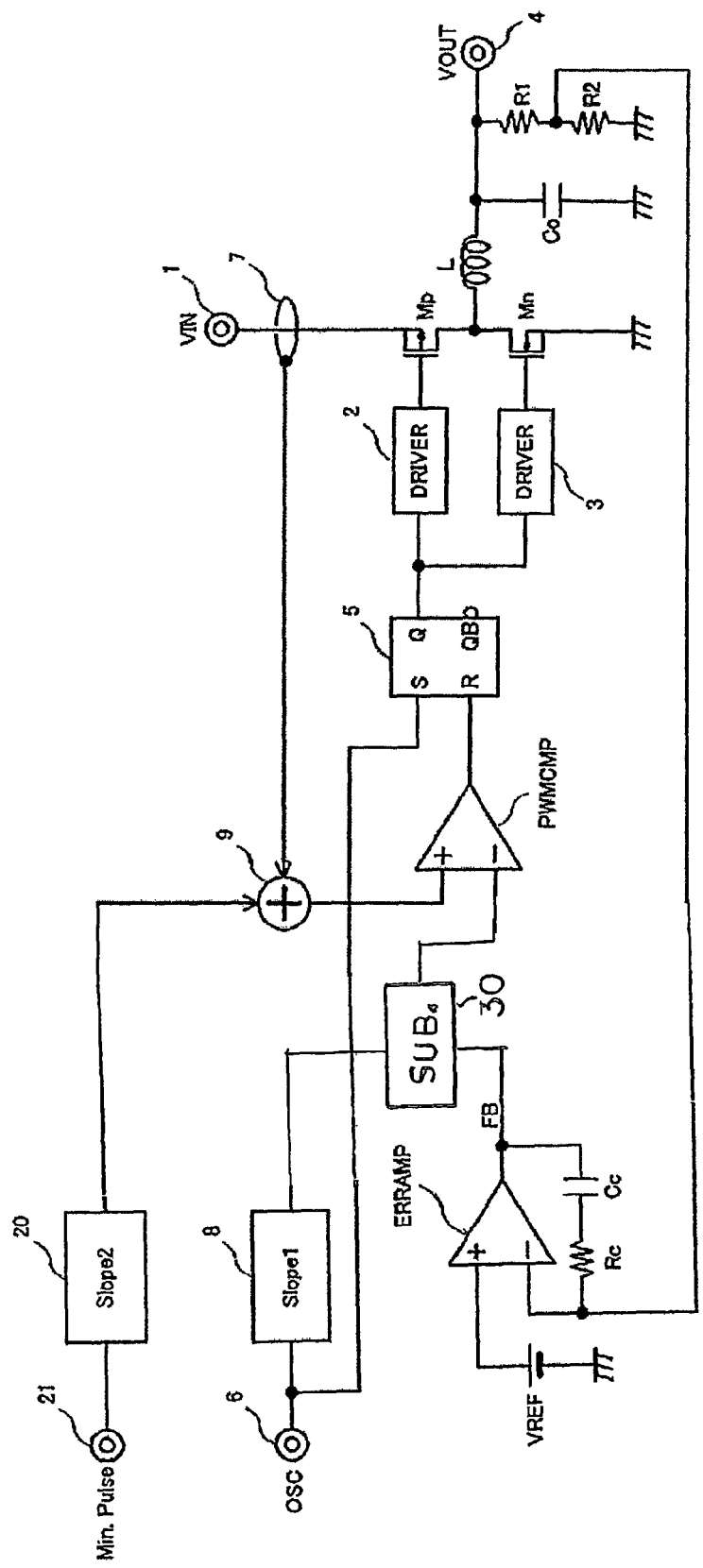
FIG. 15 is a diagram showing a modification of the embodiment shown in FIG. 1.

Further, an embodiment was explained in which a slope compensation signal was added together with the added slope signal and current detection signal to determine the sum signal and second sum signal. However, as shown in FIG. 15, a configuration may be employed in which the result of subtracting the slope compensation signal from the feedback signal FB output from the error amplifier ERRAMP, and the sum signal of the added slope signal and current detection signal, are compared by the PWM comparator PWMCMP to generate a PWM signal. The difference between the slope compensation signal and the feedback signal FB is found by a substractor 30. In this case also, the added slope signal is added to the current detection signal, so that the combined signal Vsig has at least a certain magnitude, and consequently the signal (feedback signal FB-slope compensation signal) with which this is balanced (which results in an appropriate time ratio when equal to the combined signal Vsig) is also larger than in the prior art; hence unstable operation arising from the fact that the signal used to generate the PWM signal is minute can be eliminated.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A switching power supply for controlling on/off of a switching element to generate a prescribed output voltage, comprising:
   an error amplifier, which compares the output voltage, or a divided voltage thereof, with a reference voltage and outputs an error signal according to a difference therebetween;
   current detection means, which detects a current flowing in the switching element;
   a slope compensation circuit which generates a slope compensation signal to prevent subharmonic oscillation; and
   an added slope circuit, which generates an added slope signal that is reset to zero prior to turn-on of the switching means, begins to increase when the switching means turns on and is stopped from increasing after a prescribed time shorter than a switching period of the switching element, wherein a first sum signal is determined by adding an output of the current detection means and the added slope signal, and wherein a second sum signal, obtained by further adding the slope compensation signal to the first sum signal, is compared with the error signal, and the switching element is turned off when the second sum signal becomes equal to the error signal.

2. The switching power supply according to claim 1, wherein the added slope circuit has a capacitor which is charged by a constant current, and a voltage across the capacitor is used as the added slope signal.

3. The switching power supply according to claim 2, wherein the constant current is proportional to a switching frequency of the switching element.

4. The switching power supply according to claim 3, wherein the prescribed time is proportional to the switching frequency of the switching element.

5. The switching power supply according to claim 1, wherein a rate of increase of the added slope signal is proportional to a switching frequency of the switching element.

6. The switching power supply according to claim 5, wherein the prescribed time is proportional to the switching frequency of the switching element.

7. The switching power supply according to claim 1, wherein the current detection means detects a voltage across a resistance connected to the switching element.

8. The switching power supply according to claim 1, wherein the added slope circuit has a capacitor which is charged by a constant current, and a voltage across the capacitor is used as the added slope signal.

9. The switching power supply according to claim 1, wherein a rate of increase of the added slope signal is proportional to a switching frequency of the switching element.

10. A switching power supply for controlling on/off of a switching element to generate a prescribed output voltage, comprising:

an error amplifier, which compares the output voltage, or a divided voltage thereof, with a reference voltage and outputs an error signal according to a difference therebetween;

current detection means, which detects a current flowing in the switching element;

a slope compensation circuit which generates a slope compensation signal to prevent subharmonic oscillation; and an added slope circuit, which generates an added slope signal that is reset to zero prior to turn-on of the switching means, begins to increase when the switching means turns on and is stopped from increasing after a prescribed time shorter than a switching period of the switching element, wherein a sum signal is determined by adding an output of the current detection means and the added slope signal, and wherein a difference signal, obtained by subtracting the slope compensation signal from the error signal, is compared with the sum signal, and the switching element is turned off when the sum signal becomes equal to the difference signal.

11. The switching power supply according to claim 10, wherein the added slope circuit has a capacitor which is charged by a constant current, and a voltage across the capacitor is used as the added slope signal.

12. The switching power supply according to claim 10, wherein a rate of increase of the added slope signal is proportional to a switching frequency of the switching element.

13. The switching power supply according to claim 10, wherein the added slope circuit has a capacitor which is charged by a constant current, and a voltage across the capacitor is used as the added slope signal.

14. The switching power supply according to claim 13, wherein the constant current is proportional to a switching frequency of the switching element.

15. The switching power supply according to claim 10, wherein a rate of increase of the added slope signal is proportional to a switching frequency of the switching element.

16. The switching power supply according to claim 15, wherein the prescribed time is proportional to the switching frequency of the switching element.

17. The switching power supply according to claim 15, wherein the prescribed time is proportional to the switching frequency of the switching element.

18. The switching power supply according to claim 10, wherein the current detection means detects a voltage across a resistance connected to the switching element.

19. The switching power supply according to claim 10, wherein the added slope circuit has a capacitor which is charged by a constant current, and a voltage across the capacitor is used as the added slope signal.

20. The switching power supply according to claim 10, wherein a rate of increase of the added slope signal is proportional to a switching frequency of the switching element.

* * * * *